United States Patent [19]

Sato

[11] Patent Number: 4,681,276
[45] Date of Patent: Jul. 21, 1987

[54] FISHING REEL
[75] Inventor: Jun Sato, Sakai, Japan
[73] Assignee: Shimano Industrial Company Limited, Osaka, Japan
[21] Appl. No.: 715,393
[22] Filed: Mar. 25, 1985
[30] Foreign Application Priority Data Mar. 28, 1984 [JP] Japan .............................. 59-45739[U]
Oct. 31, 1984 [JP] Japan ........................... 59-165943[U]

[51] Int. Cl.⁴ ......................................... A01K 89/02
[52] U.S. Cl. ................................ 242/84.1 R; 242/217
[58] Field of Search ................ 242/84.1 R, 211, 212, 242/213, 214, 216, 217, 218, 219, 220

[56] References Cited

U.S. PATENT DOCUMENTS 1,467,250 9/1923 Henze .................................... 242/216
1,547,238 7/1925 Russell et al. ........................ 242/218
3,184,179 5/1965 Wood, Jr. ............................. 242/217
3,432,114 3/1969 Meisner ................................ 242/220
3,478,979 11/1969 Henze .................................. 242/216

Primary Examiner—Billy S. Taylor
Attorney, Agent, or Firm—Stevens, Davis, Miller & Mosher

[57] ABSTRACT

A fishing reel having a spool supported rotatably to a reel body. A drag mechanism including a drag disc opposite to a flange of the spool transmits a driving force to the spool. A cylindrical member extends axially outwardly from the outer periphery of the flange to enclose the outer periphery of the drag mechanism. A cover shields an opening at the utmost end of an extension of the cylindrical member, and an annular projection or an annular groove guides water downwardly toward the bottom of the reel body, which water enters the reel body by way of a gap btween the outer periphery of the flange and the annular inner surface at the reel body opposite thereto. A drain is provided for draining to the exterior the water which collects at the bottom of the reel body.

4 Claims, 5 Drawing Figures

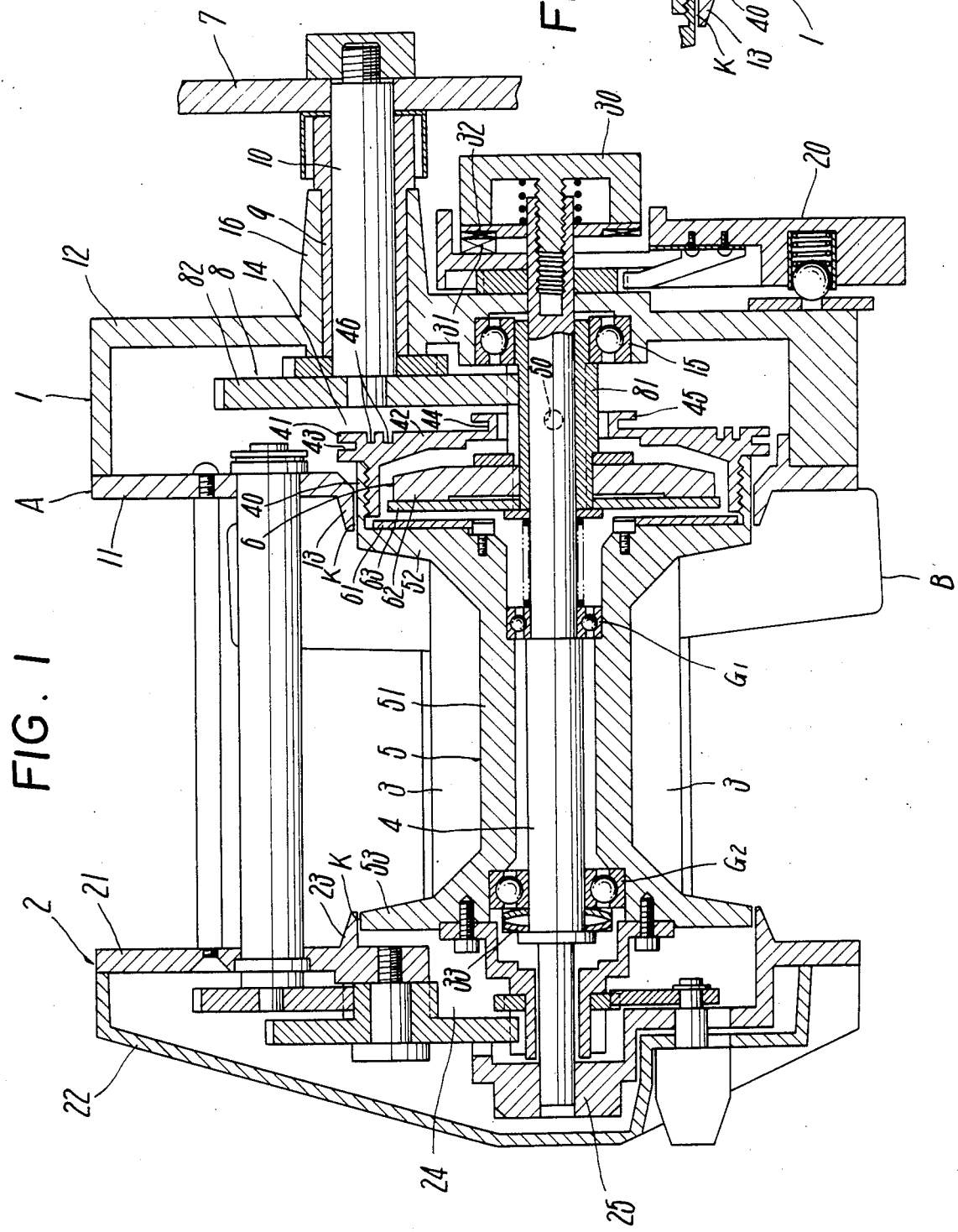

ial member

FISHING REEL

FIELD OF THE INVENTION

This invention relates to a fishing reel, and more particularly, to a fishing reel provided with a spool having a pair of flanges, a reel body rotatably supporting the spool, and a drag mechanism having a drag disc opposite to and moving toward or away from one flange at the spool so that a driving force is transmitted from the drag mechanism to the spool.

Conventionally, a fishing reel body which rotatably supports the spool has a pair of side frames opposite to each other spaced at a predetermined interval. The side frames each have an annular inner surface opposite to the outer periphery of the flange at the spool and a chamber in continuation of the annular inner surface. A spool shaft is journalled to the side frames and carries the spool rotatably through a pair of bearings. Between the outer periphery of each flange and the annular inner surfae of each side-frame is formed a gap of smaller width than a diameter of a fishing line to be wound onto the spool, thereby preventing the line from entering through the gap into the chamber. In the chamber at one side frame is contained a drag mechanism having a drag disc opposite to one flange at the spool so that a driving force transmitted by rotation of the handle is adapted to be transmitted in turn to the spool through the drag mechanism.

The fishing reel constructed as above-mentioned can prevent the line from entering into the chamber at each side frame, but the line cast into the sea or a river, while being wound or after being wound onto the spool, discharges water attached to the line, so that the water may enter through the aforesaid gap into the chamber, to wet the drag disc and drag washer at the drag mechanism in the chamber.

Since such drag washer is formed usually of friction material, such as asbestos, having hydrophilic properties, the drag washer, when wet, causes distortion to make the contact surface rugged, resulting in the drag washer coming into only partial contact with the spool to result in a dragging force.

SUMMARY OF THE INVENTION

An object of the invention is to provide a fishing reel wherein the drag washer is prevented from becoming wet with water which may enter into a reel body through a gap between the outer periphery of the flange at the spool and the annular inner surface of the reel body.

The reel of the invention is provided with a cylindrical member and a cover, which cover the drag mechanism to thereby prevent the drag mechanism from becoming wet by water, a guide means for guiding water to the bottom of the reel body which enters therein along the outer periphery of the flange, and a drain for draining therethrough the water from the chamber to the exterior.

In greater detail, the fishing reel of the invention is provided with: a spool having a pair of flanges; a reel body having annular inner surfaces opposite to the outer peripheries of the flanges at the spool and chambers in continuation of the annular inner surfaces respectively and carrying the spool rotatably; and a drag mechanism disposed within the chamber and opposite to one flange at the spool. The fishing reel according to the present invention further includes: a cylindrical member which extends axially outwardly from each flange of the spool to enclose the outer periphery of each flange and which is open at the utmost end of the extension; a cover for covering the opening at the cylindrical member; a guide means for guiding way to the bottom of the reel body, which enters into each chamber through an annular gap between the outer periphery of the flange and the annular inner surface of the reel body, and a drain which is provided at the bottom of the reel body, for draining to the exterior the water entering into the chamber.

Accordingly, even when water attached to the line enters into the reel body through the aforesaid gaps, there is no risk that water will drop on the drag mechanism, or will splash into the chamber to thereby attach to, for example, a drive mechanism or bearings at the spool shaft. Thus, the water is guided through the guide means to the bottom of the reel body, and is drained to the exterior. As a result, the drag washer at the drag mechanism is reliably prevented from becoming wet thus avoiding deterioration of its function and also avoiding rusting of the drive mechanism or the bearings.

These and other objects of the invention will become more apparent in the detailed description and examples which follow.

BRIEF DESCRIPTION OF THE INVENTION

FIG. 1 is a sectional view of a first embodiment of a fishing reel of the invention, FIG. 2 is a sectional view of a drain only, FIG. 3 is a sectional view of a second embodiment of the invention, FIG. 4 is a structural view explanatory of annular grooves in a second embodiment, and FIG. 5 is a structural view explanatory of a drain according to the second embodiment.

DETAILED DESCRIPTION OF THE INVENTION

Figure 3:
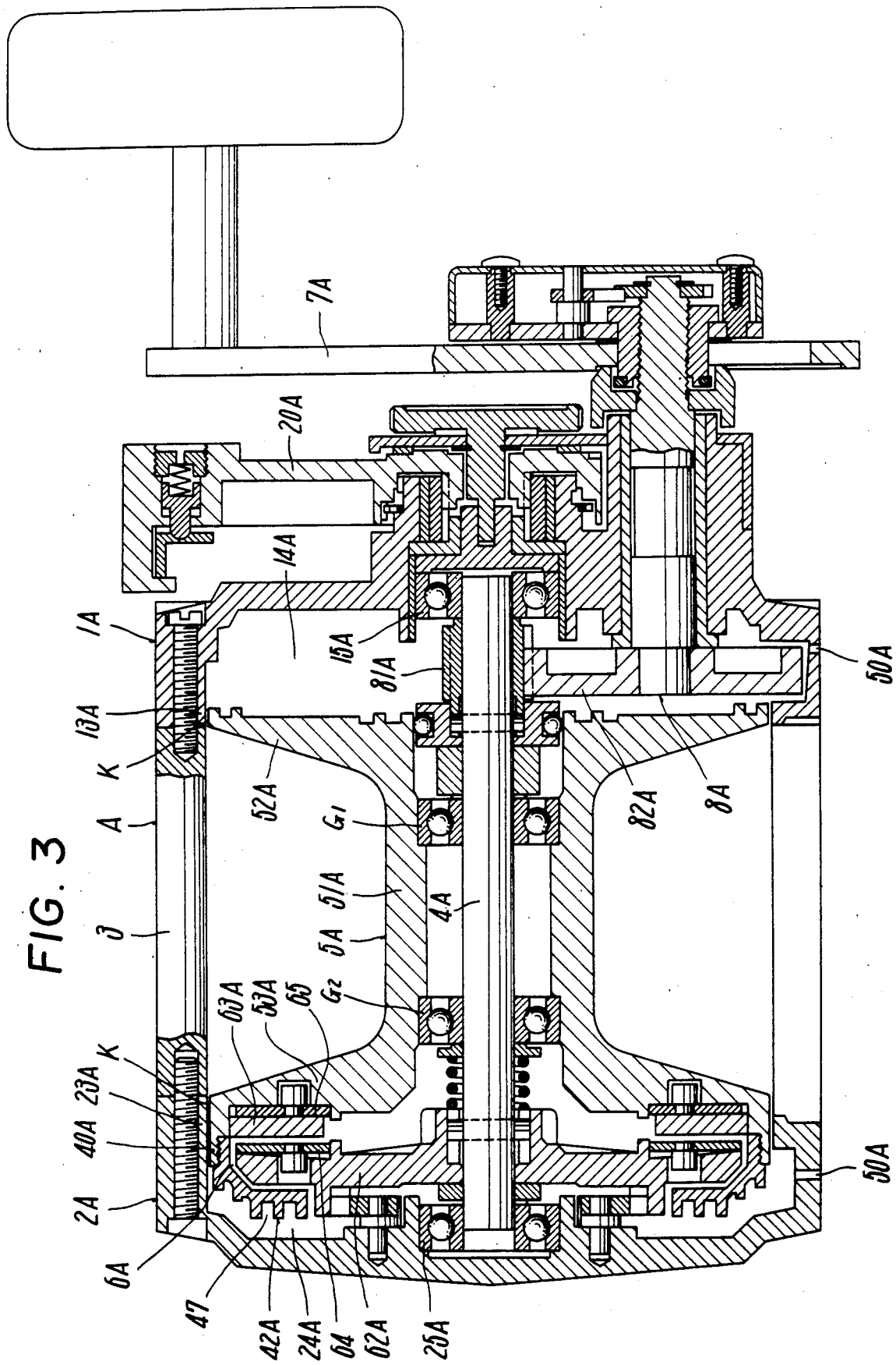

A typical embodiment of a fishing reel of the invention is shown in FIG. 1, in which a reel body A comprises a pair of side bodies 1 and 2 opposite to each other at a predetermined interval and a connecting member 3 connecting the side bodies 1 and 2 and having a mounting leg B for a fishing rod. Side bodies 1 and 2 comprise side frames 11 and 21 and side covers 12 and 22 fixed thereto respectively. Side frames 11 and 21 provide annular inner surfaces opposite to the outer peripheries of flanges at a spool 5 journalled to the side bodies 1 and 2 respectively, and between the side frame 11 and the side cover 12 and between side frame 21 and side cover 22 are provided chambers 14 and 24 in continuation of annular inner surfaces 13 and 23 respectively.

Also, bearings 15 and 25 are provided at the side covers 12 and 21 respectively to support a spool shaft 4 axially movably. Spool 5 comprising a cylindrical trunk 51 and first and second flages 52 and 53 is supported rotatably on spool shaft 4 through a pair of bearings $G_1$ and $G_2$ rotatable relative to spool shaft 4. The first and second flanges 52 and 53, as shown in FIG. 1, are opposite at the outer peripheries to the annular inner surfaces 13 and 23 through minute gaps K to prevent the line from entering therethrough into the chambers 14 and 24 respectively.

The chamber 14 at the first side body 1 houses therein: a drag mechanism 6 opposite to the first flange 51 and comprising a drag washer 61, a drag disc 62 and a contact plate 63; and a drive mechanism 8 comprising a master gear 82 in association with a handle 7 and a pinion 81 engageable with the master gear 82. A driving force is transmitted from the handle 7 to the spool 5 through the drive mechanism 8 and drag mechanism 6.

The drag disc 62 is supported to the spool shaft 4 rotatably and axially movably relative thereto. In the FIG. 1 embodiment, the drag disc 62 together with the contact plate 63 is mounted onto the pinion 81 not-rotatably relative thereto, the drag washer 61 being held onto one side of first flange 52 in relation of being not-rotatable and axially movable relative thereto.

At the side cover 12 at the first side body 1 is provided a boss 16, into which a drive shaft 10 is supported rotatably through a tubular shaft 9. Drive shaft 10 carries at its end which projects into chamber 14 the master gear 82 and has handle 7 fixed to its end which projects outward from the boss 16.

The pinion 81 is supported to the spool shaft 4 rotatably and axially movably relative thereto, in other words, the pinion 81 is supported by the bearing 15 and the spool shaft 4 is supported axially movably with respect to the pinion 81.

The spool shaft 4 passes through the pinion 81 and side cover 12 to project outwardly therefrom and rotatably supports at the outer periphery of the outward projection a drag lever 20 for controlling the axial movement of spool shaft 4 and a fixture 30 for the drag lever 20. Between the drag lever 20 and the fixture 30 are provided a pair of first and second cam bodies 31 and 32 having cam faces displaceable circumferentially, so that the drag lever 20 is rotated to axially move the second cam body 32 at the fixture 30 away from the first cam body 31, thereby axially moving the spool shaft 4 in the direction of the arrow in FIG. 1.

The axial movement of spool shaft 4 is transmitted to the spool 5 through leaf springs 33 and bearing $G_2$. Spool 5 axially moves toward the first side body 1 to bring the drag washer 61 into press-contact with the drag disc 62 through the contact plate 63, thereby giving to the spool 5 the predetermined resistance against its free rotation.

The fishing reel of the invention constructed as above-mentioned is provided at the spool 5 with a cylindrical member 40 extending axially outwardly from the outer periphery of first flange 52 and enclosing the outer periphery of drag mechanism 6. Cover 42 covers an opening at the extending cylindrical member 40, and a guide means guides water which enters into the chamber 14 through a gap between the outer periphery of flange 52 and the annular inner surface 13 at the side frame 11, toward the bottom of first side body 1. Drain 50 provided at the bottom of first side body 1 drains to the exterior the water collected on the bottom of first side body 1.

The guide means in the FIG. 1 embodiment comprises an annular projection 41 projecting radially outwardly with respect to the outer periphery of cylindrical member 40. The cylindrical member 40 is integral with the first flange 52 and is made larger in axial length than the annular inner surface 13 to enclose the drag mechanism 6.

The cover 42 is formed in a cup-shape and comprises a bottom having a central through bore and a cylinder. Cover 42 is provided at its outer periphery at bottom side with the annular projection 41 integral with the cover 42 and at the outer periphery of the cylinder with a screw thread engageable with the inner periphery of cylindrical member 40 at the first flange 52.

Alternatively, the annular projection 41 may be integral with the cylindrical member 40, or separate from both cylindrical member 40 and cover 42 and may be mounted to either one thereof.

Also, the cylindrical member 40 may be integral with the cover 42, or separate from both first flange 52 and cover 42 and may be mounted to either one thereof.

In the fishing reel according to the FIG. 1 embodiment, a first annular groove 43 is provided at the outer periphery of annular projection 41 at the cover 42, and a water collector having a second annular groove 44 projects from the central portion of cover 42. Also, third annular grooves 46 are provided at the circumferential outside surface of the bottom of cover 42.

In the fishing reel of the invention constructed as above-mentioned, the fishing line cast into the sea or a river, while being wound or after being wound, onto the spool, discharges water attached to the line. Water flows along the outer periphery of spool 5 and enters through the gap K into the chamber 14, but is blocked by annular projection 41. The water is then guided downwardly along the lateral side thereof and along the outer periphery of cylindrical member 40 and drops to the bottom of chamber 14. The water then drains naturally to the exterior from the drain 50, thereby preventing water which enters into chamber 14 from wetting the drag mechanism 6 therein.

Also, in the FIG. 1 embodiment, if water rides on the annular projection 41, it falls into the first annular groove 43 to flow therealong toward the bottom of chamber 14. If the water flows beyond the annular projection 41, it falls along the outside surface of cover 42 into the second annular groove 44 and drops onto the bottom. Thus, the water entering into the chamber 14 is blocked in the three steps and the third annular grooves 46 let the water flow on the outside surface of cover 42 toward the bottom thereof along the grooves 46, thereby providing further effectiveness in preventing the drag mechanism from getting wet.

Incidentally, this invention may be applicable to a fishing reel having housed therein the drag mechanism in the chamber 24 at the second side body 2.

Also, the drag mechanism 6 is provided at the first side body 1 as in the FIG. 1 embodiment so that the spool 5 moves toward the first side body 1 to be subjected to resistance against its free rotation. Hence, the second side body 2 is not subjected to an urging force by the drag mechanism, whereby the connectors 3 need not be formed to endure a heavy load, thus making the reel lightweight as a whole.

Alternatively, the cover 42A may, as shown in FIG. 3, be provided at the outer surface with only annular grooves instead of the annular projection 41.

Next, explanation will be given on an embodiment shown in FIG. 3. First and second side bodies 1A and 2A constituting the reel body A are provided with annular inner surfaces 13A and 23A, and a spool shaft 4A is supported rotatably and axially movably through bearings 15A and 25A to the side bodies 1A and 2A. A spool 5A having a pair of flanges 52A and 53A is supported rotatably onto the spool shaft 4A, and a drive mechanism 8A having a handle 7A, a master gear 82A and a pinion 81A is provided at the side body 1A. A drag mechanism 6A is provided in chamber 24A at the second side body 2A. A cylindrical member 40A and a cover 42A for covering the drag mechanism 6A are provided at the second flange 53A, and at the outer surface of cover 42A are provided third annular grooves 47 as guide means for guiding toward the bottom of second side body 2A water entering into the chamber 24A through a gap K formed between the outer periphery of flange 53A and the annular inner surface 23A formed at the side body 2A.

Also, in this embodiment, water entering through the gap K is guided toward the bottom of second side body 2A through the annular grooves 47 and is discharged from a drain 50A in the former of a through bore formed at the bottom of second side body 2A.

Figure 4:
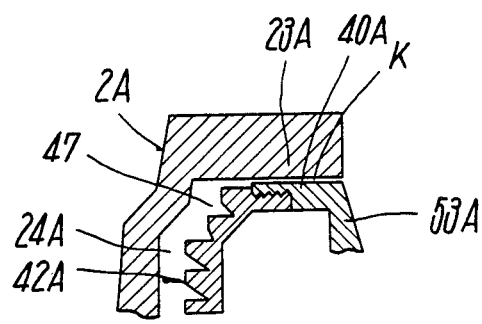
Figure 5:
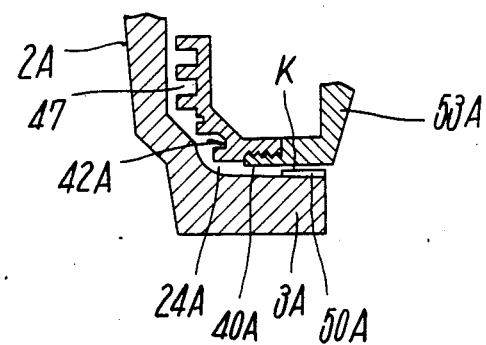

Alternatively, the annular grooves 47 each may be formed in a V-like shape as shown in FIG. 4. The number of grooves is not defined but preferably are plural. Also, the drain 50A' may be formed in a groove provided at the annular inner surface 23A at the second side body 2A as shown in FIG. 5. The drag mechanism 6A shown in FIG. 3 comprises a drag disc 62A supported to the spool shaft 4A rotatably relative thereto, drag washers 64 and 65 held to the second flange 53A and drag disc 62A respectively, and a contact plate 63A interposed between the drag washers 64 and 65. In addition, in FIG. 3, reference numeral 3A designates a connecting rod and 20A designates a drag lever.

As seen from the above, the fishing reel of the invention provides (1) a drag mechanism covered with a cylindrical member and cover, (2) at least one of the cylindrical member and cover a guide means for guiding water toward the bottom of the reel body, which enters through the gap between the outer periphery of each flange and the annular inner surface, and (3) at the bottom of the reel body a drain for draining the water to the exterior. Thus, even when the water enters into the reel body through the gap, the drag washer at the drag mechanism is reliably prevented from becoming wet by the water and the water collected on the bottom is drained to the exterior through the drain.

Although several embodiments have been described, they are merely exemplary of the invention and not to be construed as limiting, the invention being defined soley by the appended claims.

What is claimed is:

1. A fishing reel, comprising:
   a spool having a pair of flanges,
   a reel body having an annular inner surface opposite an outer periphery of one said flange and forming a chamber in continuation of said annular inner surface, said spool being rotatably supported to said reel body,
   a drag mechanism disposed in said chamber and having a drag disc opposite to the one said flange of said spool,
   a cylindrical member having an extension (i) extending axially outwardly from the outer periphery of the one said flange of said spool, (ii) enclosing a periphery of said drag mechanism, and (iii) having an opening at an utmost end of said extension,
   a cover for covering said opening at the utmost end of said extension of said cylindrical member,
   a guide means for guiding water toward a bottom of said reel body, which water enters into said chamber through a gap between the outer periphery of the one said flange and the annular inner surface of said reel body, said guide means comprising at least one annular projection (i) disposed axially adjacent said utmost end of said extension of said cylindrical member, (ii) disposed on a radial outer side of said cover, and (iii) projecting radially outwardly with respect to the outer periphery of said cylindrical member, and
   a drain located at the bottom of said reel body for draining to a region exterior to said reel body water entering into said chamber.

2. A fishing reel as set forth in claim 1, wherein said annular projection has a first radially recessed annular groove.

3. A fishing reel as set forth in claim 2, wherein an outside surface of a central portion of said cover includes a water collector having a second radially recessed annular groove.

4. A fishing reel as set forth in claim 3, wherein said guide means comprises a third axially recessed annular groove positioned at an outer surface of said cover.

* * * * *